United States Patent
Chen et al.

(10) Patent No.: US 7,146,109 B2
(45) Date of Patent: Dec. 5, 2006

(54) ANALOG MODULATION OF OPTICAL SIGNALS

(75) Inventors: Young-Kai Chen, Berkeley Heights, NJ (US); Andreas Leven, Long Hill Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 652 days.

(21) Appl. No.: 10/133,469

(22) Filed: Apr. 26, 2002

(65) Prior Publication Data

US 2004/0208642 A1 Oct. 21, 2004

(51) Int. Cl.
*H04B 10/04* (2006.01)

(52) U.S. Cl. .............. 398/183; 398/182; 398/185; 398/186; 398/187; 398/188; 398/190; 398/191; 398/192; 398/102; 398/161; 398/158; 398/159; 398/91

(58) Field of Classification Search .......... 359/122, 359/162, 245, 173, 156, 279, 126; 385/24, 385/20; 398/162, 181, 182, 185, 183, 186, 398/188, 190, 191, 102, 161, 158, 159, 91, 398/187

See application file for complete search history.

(56) References Cited

U.S. PATENT DOCUMENTS

| | | | |
|---|---|---|---|
| 5,491,576 A * | 2/1996 | Bergano | 398/185 |
| 5,515,196 A * | 5/1996 | Kitajima et al. | 398/185 |
| 5,777,771 A * | 7/1998 | Smith | 398/182 |
| 6,097,525 A * | 8/2000 | Ono et al. | 398/185 |
| 6,421,478 B1 * | 7/2002 | Paiam | 385/24 |
| 7,003,231 B1 * | 2/2006 | Way et al. | 398/186 |
| 2001/0055137 A1 * | 12/2001 | Kuri et al. | 359/162 |
| 2002/0003641 A1 * | 1/2002 | Hall et al. | 359/122 |
| 2002/0159121 A1 * | 10/2002 | Spickermann | 359/188 |
| 2003/0198478 A1 * | 10/2003 | Vrazel et al. | 398/183 |

OTHER PUBLICATIONS

Paul Yu, Dual Fnction Semiconductor Electroabsorbtion Device for Optoelectric FR Transceiver, 98-184, 1998.
Stanford University, pp. 1-2, printed Jan. 3, 2002.
Updated Version—Publications—Photonics & Networking Research Laboratory at Stanford University, pp. 1-2, printed Sep. 15, 2003.
W. D. Jemison et al. "Microwave Photonic Vector Modulator for High-Speed Wireless Digital Communications", IEEE Microwave and Wireless Components Letters, vol. 12, No. 4, Apr. 2002, pp. 125-127.
R. S. Tucker et al. "Optical Time-Division Multiplexing For Very High Bit-Rate Transmission", Journal of Lightwave Technology, vol. 6, No. 11, Nov. 1988, pp. 1737-1749.

* cited by examiner

*Primary Examiner*—Hanh Phan

(57) ABSTRACT

An optically modulated signal is generated for use in transporting data by generating a so-called sub-carrier modulated optical signal and, then, vector modulating the sub-carrier modulated optical signal to yield the desired modulated optical signal for transmission. The vector modulation includes a phase component and an amplitude component. In one specific embodiment of the invention, an apparatus for use in generating a modulated optical signal includes a generator to generate a sub-carrier modulated optical signal including an optical carrier and at least one sub-carrier and an analog vector modulator coupled to receive both the sub-carrier modulated optical signal from the generator and a data signal. The analog vector modulator generates an output optical signal by phase modulating and/or amplitude modulating the sub-carrier of the received optical signal in response to the data signal.

20 Claims, 4 Drawing Sheets

VECTOR MODULATOR 104

VECTOR MODULATOR 104

| SYMBOL | BINARY INPUT | VECTOR | $V_1$ | $V_2$ | $V_3$ |
|---|---|---|---|---|---|
| A | 0 0 | 1 < 60° | 0 | 0 | 0 |
| B | 0 1 | 1 <− 60° | $V\pi$ | 0 | 0 |
| C | 1 0 | 1 < 180° | 0 | 0 | $V\pi$ |
| D | 1 1 | 0 | 0 | $V\pi$ | 0 |

ANALOG MODULATION OF OPTICAL SIGNALS

TECHNICAL FIELD

This invention relates to optical transmission systems and, more particularly, to analog modulation of optical signals.

BACKGROUND OF THE INVENTION

There is a clear trend towards using higher carrier frequencies and high date rates in optical communications systems. One such arrangement employs Mach Zehnder modulators supplied with individual light, i.e., optical carrier, signals to be modulated. Each of the Mach Zehnder modulators is modulated directly by a microwave sub-carrier that has been modulated with the desired digital data. See for example, an article authored by W. D. Jemison et al., entitled "Microwave Photonic Vector Modulator for High-Speed Wireless Digital Communications", IEEE Microwave And Wireless Components Letters, pp 125–127, Vol. 12, No. 4, April 2002. This and other known optical signal modulation arrangements have limited bandwidth and, hence, there is a limit on the data rate that may be used in optical communications systems employing such modulation schemes.

SUMMARY OF THE INVENTION

These and other problems and limitations of prior known optical modulation arrangements are overcome in applicants' unique invention by generating a so-called sub-carrier modulated optical signal and, then, vector modulating the sub-carrier modulated optical signal to yield the desired modulated optical signal for transmission. The vector modulation includes a phase component and/or an amplitude component.

In one specific embodiment of the invention, the vector modulation is effected by splitting the sub-carrier modulated optical signal comprising a carrier and an at least one unmodulated sub-carrier into a plurality of similar optical signals, phase modulating the carrier of each of the similar optical signals with the data and delaying the resulting optical signals in a prescribed manner relative to one another. Then, the "delayed" signals are combined to yield the signal comprising the vector modulated sub-carrier modulated optical signal to be transmitted. Wherein a signal can be "delayed" by a zero (0) delay interval.

In another embodiment of the invention, the "sub-carrier modulated optical signal" is obtained by using two optical carriers that are slightly offset in wavelength relative to each other so as to generate a beating tone in a remote photodiode detector. The two optical carriers are coupled together and supplied to the vector modulator to be vector modulated with the data signal.

In yet another embodiment of the invention, the phase modulators in the vector modulator are grouped in sets. Then, the phase modulated optical signals in each set are each delayed by the same interval for that set. The delay intervals for the individual sets are in a prescribed relationship to each other. In one example, a first set has zero delay interval, a second set has a delay interval of τ, a third set has a delay interval of 2τ, a fourth set has a delay interval of 3τ and so on.

In still another embodiment of the invention, the data signal is precoded to generate signals to drive particular ones of the phase modulators of the vector modulator to desired vector modulation states for each state of the data signal.

DETAILED DESCRIPTION OF EMBODIMENTS OF THE INVENTION

Figure 1:
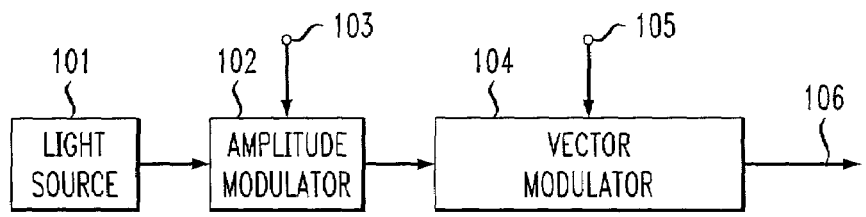
FIG. 1 shows, in simplified block diagram form, one embodiment of the invention.

FIG. 1 shows, in simplified block diagram form, one embodiment of the invention. Specifically, shown is optical light source 101 typically including a laser to generate an optical carrier signal at a desired wavelength. Exemplary optical carrier signals to be processed have optical frequencies of about $2.3 \times 10^{14}$ Hertz to about $1.8 \times 10^{14}$ Hertz, i.e., a wavelength of about 1.3 microns to about 1.7 microns. In one example, an optical carrier signal having a wavelength of approximately 1.55 microns, i.e., a frequency of $1.93 \times 10^{14}$ Hertz is generated by light source 101 and supplied to amplitude modulator 102. Also supplied to amplitude modulator 102 via input 103 is a desired amplitude modulation signal that modulates the optical carrier from source 101 to obtain a sub-carrier modulated optical signal. As is known, the spectrum of this signal includes the optical carrier and two sidebands, i.e., sub-carriers. This modulation may be achieved in a number of ways. It can be realized by use of an electro-optical modulation scheme through either direct modulation of the laser in source 101 or by an external modulation using, for example, a Mach Zehnder modulator or an electro-absorption modulator. The frequency of the modulation signal is in the microwave/millimeter-wave range. Another approach using two optical carrier signals is described below in conjunction with the embodiment of FIG. 3. The sub-carrier-modulated optical signal from amplitude modulator 102 is supplied to vector modulator 104 where the subcarrier is phase and/or amplitude modulated, i.e., vector modulated with a data signal supplied via input 105 to yield the optical transport signal at output 106. In this embodiment, the data rate can be as high as the sub-carrier frequency. Embodiments of vector modulators 104 that may be employed in the embodiment of the invention of FIG. 1 are shown in FIGS. 4 and 5 and described below.

Figure 2:
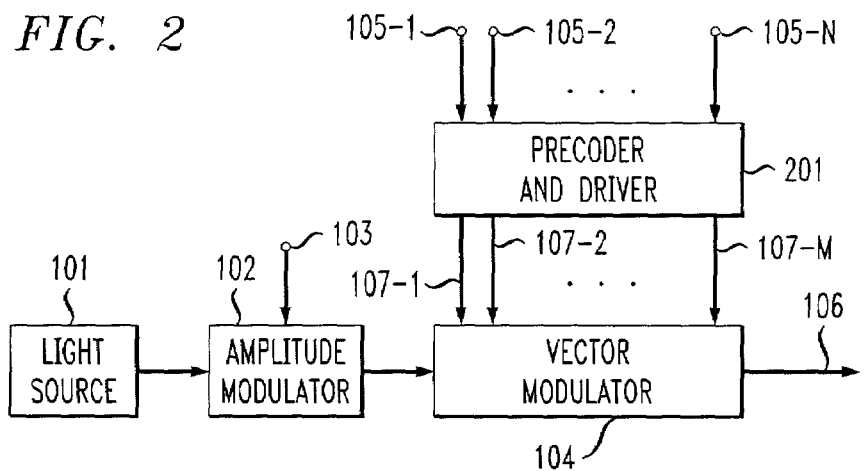
FIG. 2 also shows, in simplified block diagram form, a second embodiment of the invention.

FIG. 2 also shows, in simplified block diagram form, a second embodiment of the invention. The embodiment of FIG. 2 is similar to that of FIG. 1 and includes similar elements that are essentially identical from both a physical and functional standpoint. These similar elements have been similarly numbers as those in FIG. 1 and will not be discussed again in detail. The only significant difference between the embodiments of FIG. 1 and FIG. 2 is the use of Precoder and Driver 201. As can be seen, one or more data signals are supplied to precoder and driver 201 via input connections 105-1 through 105-N. In precoder and driver 201, the data signals are employed to code and generate voltage signals for driving, phase modulators in vector modulator 104. These voltage signals are supplied via output connections 107-1 through 107-M to vector modulator 104. Again, details and operation of vector modulator 104 are described below regarding FIGS. 4 and 5 and a simple example of operation of precoder and driver 201 in conjunction with vector modulator 104 is described below regarding FIG. 7.

Figure 3:
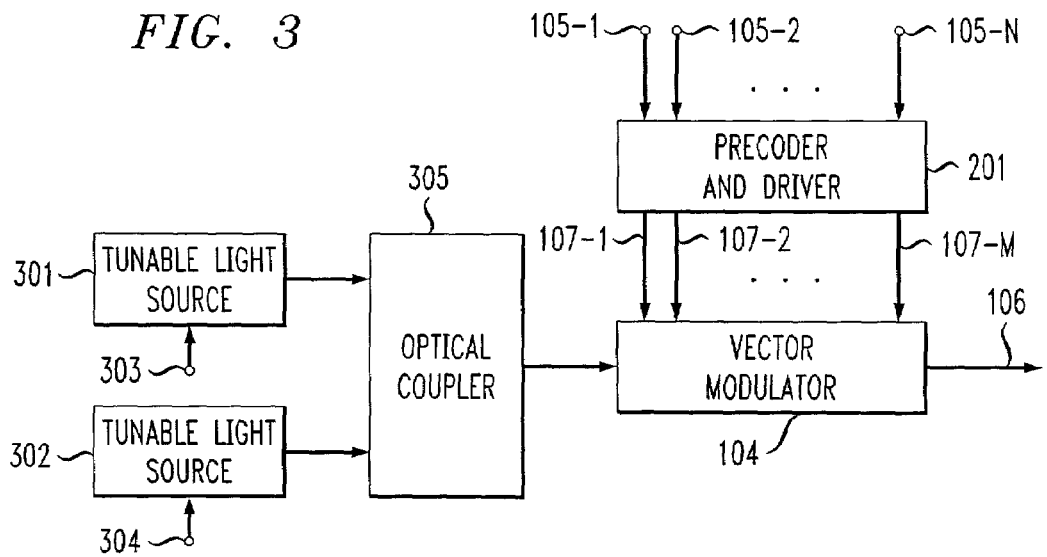
FIG. 3 illustrates, in simplified block diagram form, a third embodiment of the invention.

FIG. 3 illustrates, in simplified block diagram form, a third embodiment of the invention. The embodiment of FIG. 3 is similar to that of FIG. 2 and includes similar elements that are essentially identical from both a physical and functional standpoint. These similar elements have been similarly numbers as those in FIG. 2 and will not be discussed again in detail. The only significant difference between the embodiments of FIG. 2 and FIG. 3 is how the sub-carrier modulated optical signal is generated in the embodiment of FIG. 3. As indicated above, there are several ways of generating the desired sub-carrier modulated optical signal upon which the data signal will eventually be modulated. In the embodiment of FIG. 3, a coherent technique is advantageously employed to realize the desired sub-carrier modulated optical signal. Specifically, in this example, two carrier optical signals are generated by employing tunable laser light sources 301 and 302. Signals for controlling the frequency (wavelength) of the laser light are supplied via connections 303 and 304 to tunable light sources 301 and 302, respectively. The resulting two optical carrier signals are tuned to have a prescribed wavelength offset and are overlaid coherently. At a receiving detector, typically a photodiode, the difference in wavelength generates a beating signal. The lasers, in this example, are single mode tunable lasers. This allows very wide tunability, since tuning the wavelength of one laser directly changes the frequency of the beating signal. Another advantage of using the two tunable lasers is that the resulting optical synthesizer generates a virtually harmonic free optical source. This results in an improved dynamic range and spurious free dynamic range of the optical link. Then, the two optical carriers that are offset relative to each other are supplied to optical coupler 305 where they are combined, i.e., mixed, to form the desired o sub-carrier modulated optical signal, which is supplied to vector modulator 104.

Figure 4:
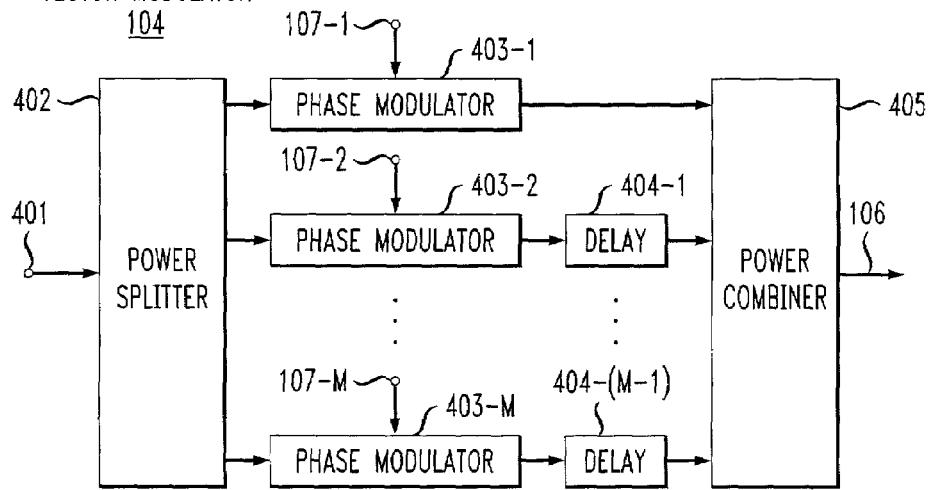
FIG. 4 shows, in simplified block diagram form, details of a vector modulator that may be employed in the embodiments of the invention.
Figure 5:
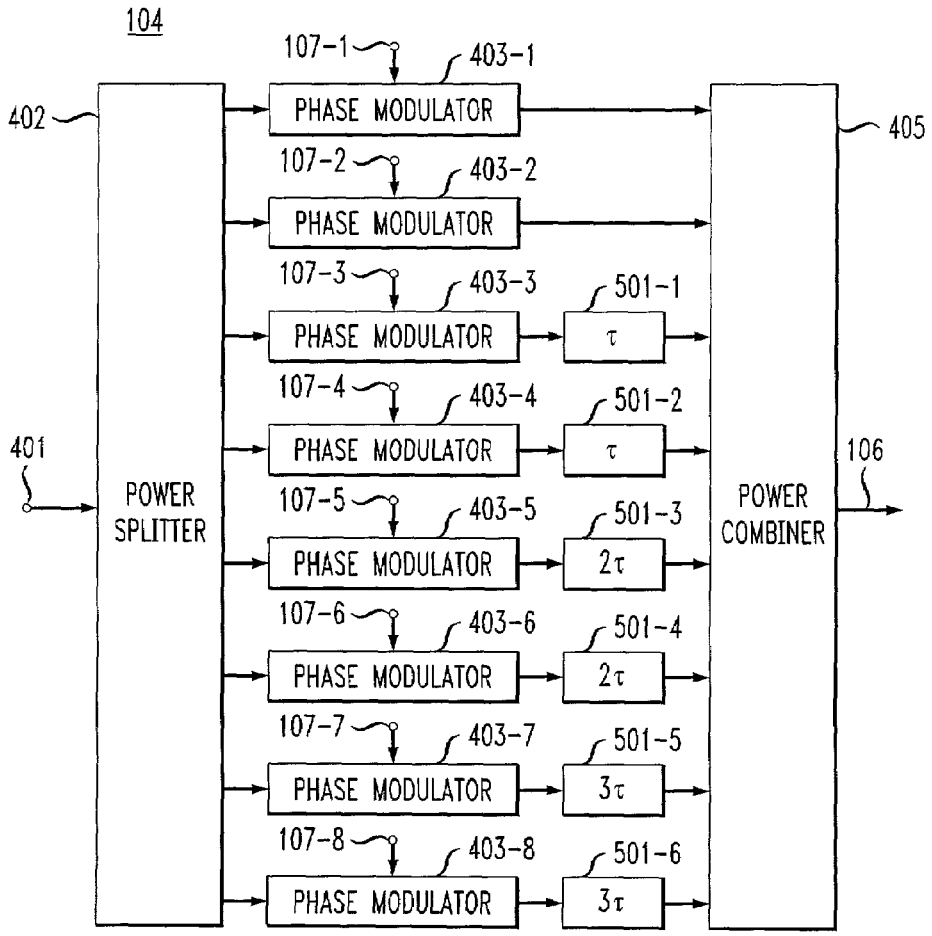
FIG. 5 shows, in simplified block diagram form, details of a specific vector modulator that may be employed in the embodiments of the invention.

FIG. 4 shows, in simplified block diagram form, details of one vector modulator 104 that may be employed in the embodiments of the invention. The optical vector modulator 104 is based on the summing of multiple optical tapped delay lines. The principle of operation is as follows: The to be phase-shifted and/or to be amplitude-modulated signal could either be an amplitude-modulated single optical carrier generated by amplitude modulator 102 (FIG. 1 or FIG. 2) or include two optical carriers that are slightly offset in wavelength to generate a beating signal generated by tunable light sources 301 and 302 and coupler 305 of FIG. 3. This sub-carrier modulated optical signal is, when fed via 401 into the optical vector modulator 104 of FIG. 4, split into a plurality of similar branches by a power splitter 402, e.g., a multimode interference (MMI) coupler. Each branch is equipped with a phase modulator 403-1 through 403-M to adjust the phase of the optical carrier followed by an optical delay line. The delay in series with phase modulator 403-1, in this example, is zero (0). The delays in the remaining branches including phase modulators 403-2 through 403-M are generated by delay units 404-1 through 404-(M−1), respectively. Each of these delay lines in delay units 404-1 through 404-(M−1) changes the phase of the sub-carrier of the optical signal from phase modulators 403-2 through 403-M, respectively, by a fixed amount. For example, the delay line in unit 404-1 provides a delay of $\tau$, delay unit 404-2 provides a delay of $2\tau$ and delay unit 404-(M−1) provides a delay of $(M-1)\tau$. Typically, a delay $\tau$ of 1/(M*sub-carrier frequency) is required. Thus, if the sub-carrier frequency is 40 GHz, the total delay range should be 0, . . . 25 picoseconds (ps). Another MMI coupler, i.e., power combiner 405, combines all of the phase-shifted and delayed optical signals from all branches to produce a modulated output optical signal at output 106, which will interfere constructively or destructively depending on the summing optical phases from all tributary branches. Therefore, by interfering signals with different carrier phase, the phase and the amplitude of the carrier of the summing signal can be set to an arbitrary state. These interfered optical carriers will produce microwave phasors with prescribed amplitude and phase at the remote optical detector.

The phase modulator 403 of each branch can be fabricated e.g. in a material system with linear electro-optic effect, as InP, GaAs or $LiNbO_3$. The effective refractive index of an optical waveguide changes in proportion to the applied electrical field perpendicular to this waveguide. A high frequency distributed electrical waveguide is engineered to co-propagate with the optical wave with matched propagating velocity to deliver the local electrical field with high modulation bandwidth. The different branches will delay the optical signal by a different length of time. This results in different sub-carrier phases at the outputs of these delay lines in units 404. In the combiner 405, these different output signals that interfere constructively have a different sub-carrier phase due to the different time delays these signals experienced. The sub-carrier of the signal after the MMI coupler, i.e., power combiner 405, is the sum of all sub-carriers of the signals that interfere constructively.

FIG. 5 shows, in simplified block diagram form, details of a specific vector modulator that may be employed in the embodiments of the invention. Such an optical vector phase modulator 104 can be realized in a number of different configurations. One of the simplest designs is to use eight branches, which are grouped into pairs of two with the same delay line length. Basically, the branch pairs form Mach-Zehnder modulators 403. The delay lengths of these different pairs are designed such that they differ by a quarter period of the center frequency of the envelope signal. If now only one of the Mach-Zehnder structures is biased such that the optical signal of each arm interferes constructively, one can set four different phase states each separated by 90°. If two neighboring Mach Zehnder phase modulators 403 are switched on together, this results in a phase offset of 45° in comparison to the signal from a single Mach Zehnder phase modulator 403.

Specifically, FIG. 5 shows input 401 to which an appropriate sub-carrier modulated optical signal is supplied, for example, from amplitude modulator 102 of FIG. 2 or the two combined offset optical carriers generated by tunable light sources 301 and 302 and coupler 305 of FIG. 3. The supplied signal is split into eight branches and a branch is supplied to each one of phase modulators 403-1 through 403-8. Again, the phase modulators 403-1 through 403-8 are grouped into sets of two and each set has a different delay path. For example, a first set including phase modulators 403-1 and 403-2, has a zero delay; a second set including phase modulators 403-3 and 403-4, has a delay of τ generated by delay lines in delay units 501-1 and 501-2; a third set including phase modulators 403-5 and 403-6, has a delay of 2τ generated by delay lines in delay units 501-3 and 501-4; and a fourth set including phase modulators 403-7 and 403-8, has a delay of 3τ generated by delay lines in delay units 501-5 and 501-6. The optical signals from the eight branches are combined in power combiner 405 to yield the desired output optical signal at output 106.

Figure 6:
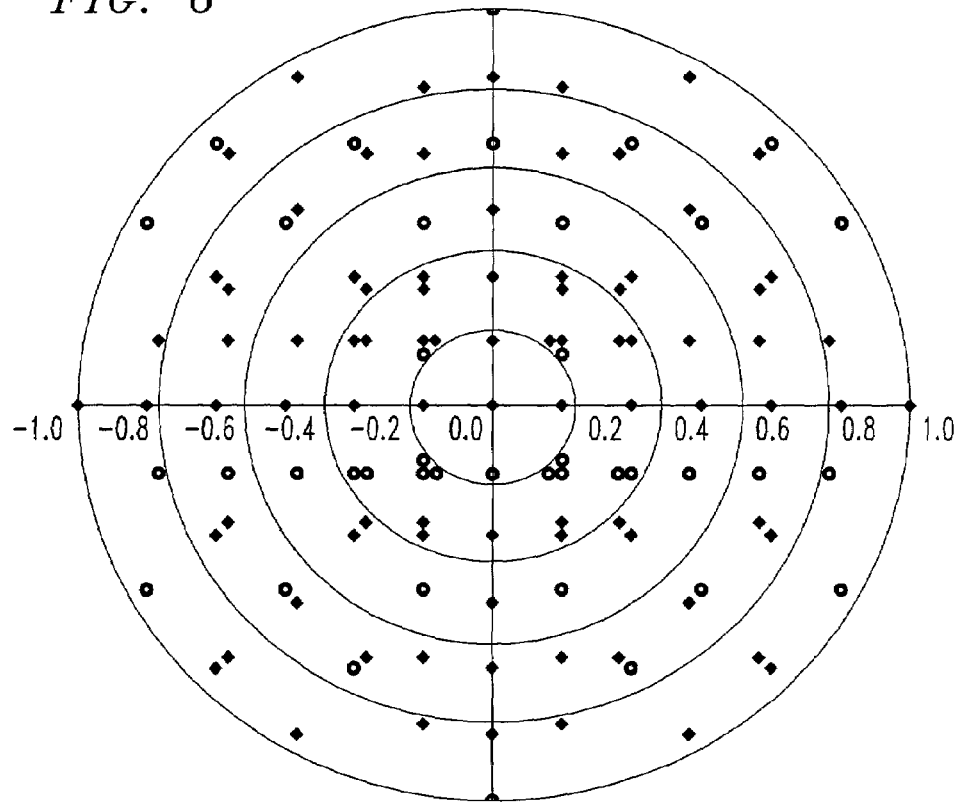
FIG. 6 shows a constellation plot showing states of the vector modulator of FIG. 5.

FIG. 6 shows all possible phase/amplitude states of the optical envelope produced by vector modulator 104 of FIG. 5, if each phase modulator is driven either with 0V or with a Voltage that results in a π/2 phase shift of the optical carrier or with a Voltage that results in a π phase shift of the optical carrier. It is possible to use digital, multi-level or analog control signals, which allows obtaining all possible phase/amplitude states in-between the discrete ones shown in FIG. 6.

Figure 7:
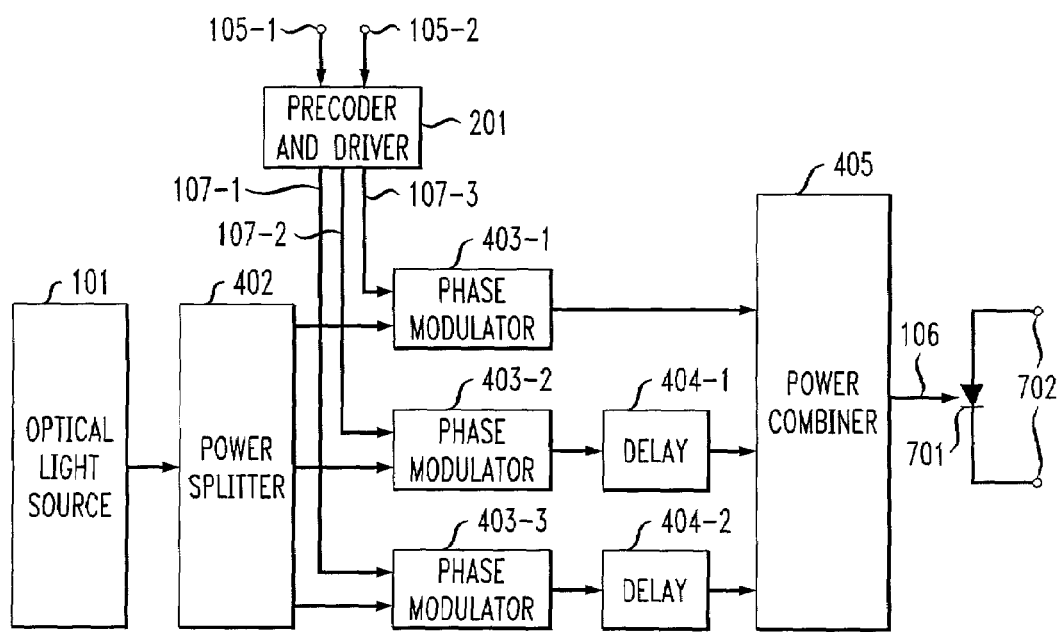
FIG. 7 illustrates, in simplified block diagram form, a simplified version of the invention to illustrate operation of the precoder and driver 201 shown in FIGS. 2 and 3.
Figures 8, 9:
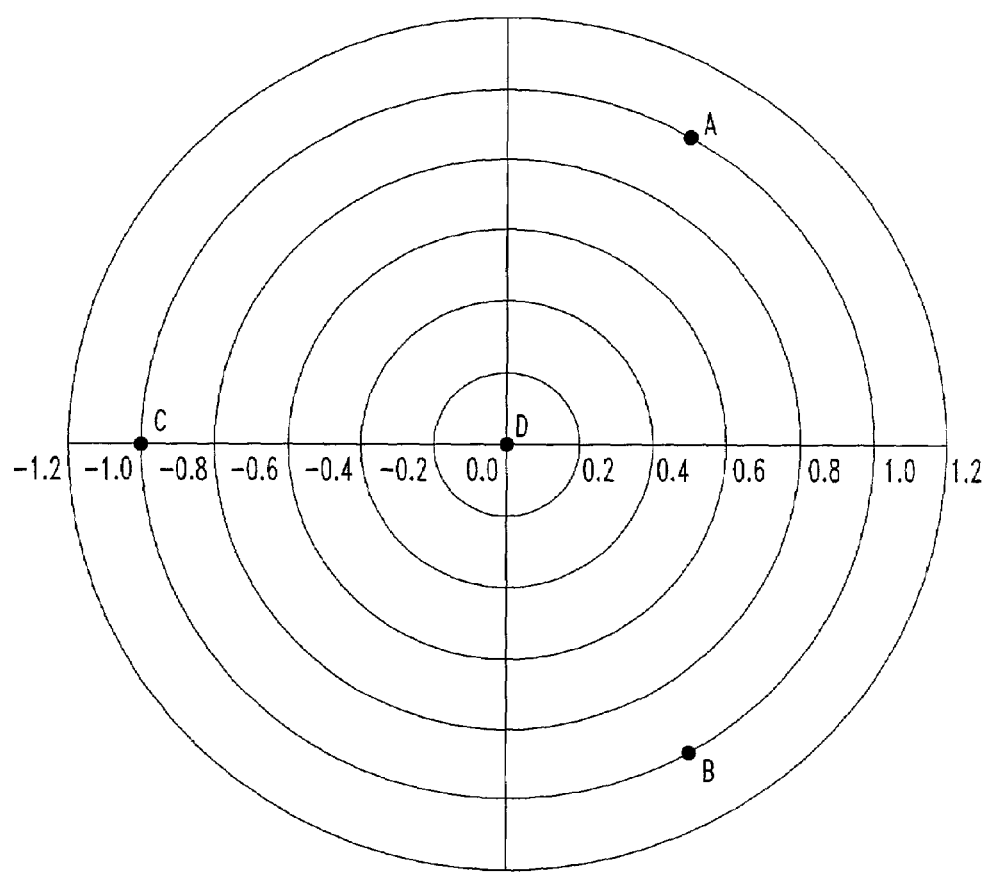
FIG. 8 is a table useful in explaining the operation of precoder and driver 201.
FIG. 9 is a constellation plot showing the states of the modulator shown in FIG. 7.

FIG. 7 illustrates, in simplified block diagram form, a simplified version of the invention to illustrate operation of the precoder and driver 201 shown in FIGS. 2 and 3. Specifically, optical light source 101 supplies an sub-carrier modulated optical signal to the vector modulator 104 and, therein, to power splitter 402. In this example, power splitter 402 splits the supplied optical carrier into three equal versions, i.e., branches, each of which is supplied to one of phase modulators 403-1, 403-2 and 403-3. An output of phase modulator 403-2 is supplied to delay unit 404-1 wherein a delay line delays the phase modulated signal by τ. An output of phase modulator 403-3 is supplied to delay unit 404-2 wherein a delay line delays the phase modulated signal by 2τ. In turn, the output from phase modulator 403-1 and the outputs from delay units 404-1 and 404-2 are supplied to power combiner 405 where they are combined, as described above, to generate the desired transport output optical signal at output 106. The transport optical signal is transmitted to a remote receiver where it is detected via, for example photodiode 701, which generates a desired signal at terminals 702. Returning, phase modulators 403-1, 403-2 and 403-2 are supplied control signals via paths 107-1, 107-2 and 107-3, respectively, from precoder and driver 201. The operation of precoder 201 can be explained by referring to the table in FIG. 8. In this example, it is desired to generate symbols A, B, C and D. This is realized by supplying a binary input to terminal 105-1 and 105-2 of precoder and driver 201. As seen in FIG. 9, the desired vectors corresponding to the location of the symbols A, B, C and D in the constellation shown in FIG. 9 are (0,0) 1<60°, (0,1) 1<−60°, (1,0) 1<180° and (1,1) 0, respectively. These vectors are realized by controlling phase modulators 403-1, 403-2 and 403-3 by the modulation voltages $V_1$, $V_2$ and $V_3$, respectively. Thus, for symbol A (binary input 0,0) $V_1=V_2=V_3=0$, for symbol B (binary 0,1) $V_1=V_\pi$ and $V_1=V_2=0$, for symbol C (binary 1,0) $V_1=V_2 0$ and $V_3=V_\pi$ and for symbol D (binary 1,1) $V_1=V_3=0$ and $V_2=V_\pi$.

The above-described embodiments are, of course, merely illustrative of the principles of the invention. Indeed, numerous other methods or apparatus may be devised by those skilled in the art without departing from the spirit and scope of the invention.

We claim:

1. Apparatus for use in generating a modulated optical signal comprising:

a generator to generate a sub-carrier modulated optical signal including an optical carrier and at least one sub-carrier; and an analog vector modulator coupled to receive both said sub-carrier modulated optical signal from the generator and a data signal and configured to generate an output optical signal by phase modulating and/or amplitude modulating the sub-carrier of the received optical signal in response to said data signal, said analog vector modulator including an optical power splitter, a plurality of optical branches, and an optical power combiner, the splitter being configured to split said optical sub-carrier signal into a plurality of optical branch signals and to supply each optical branch signal to a corresponding one of said optical branches, each of said optical branches including an optical phase modulator for phase shifting its supplied optical branch signal.

2. The apparatus as defined in claim 1 wherein said generator of said sub-carrier modulated optical signal includes a source of the optical carrier signal, an optical amplitude modulator and a device to supply a baseband signal to said optical amplitude modulator, the modulator amplitude modulating said optical carrier signal to generate said sub-carrier modulated optical signal in response to receiving said baseband signal.

3. The apparatus as defined in claim 1 wherein said generator of said optical sub-carrier modulated optical signal includes at least a first tunable source of an optical carrier signal, a second source of an optical carrier signal source, the first source capable of producing the first optical carrier signal with a frequency that is offset relative to a frequency of said second optical signal, and an optical coupler for mixing said first optical carrier signal and said second optical carrier signal to yield said sub-carrier modulated optical signal.

4. The apparatus as defined in claim 1 wherein said analog vector modulator further includes an optical delay for delaying the corresponding optical branch signal, the power combiner being configured to combine said plurality of delayed optical phase shifted signals to generate said output optical carrier signal.

5. The apparatus as defined in claim 4 wherein a delay interval produced by a Mth branch is (M−1), where M is the number of branches and M=1, 2 . . . M.

6. The apparatus as defined in claim 4 wherein said branches are grouped in a plurality of sets including at least two branches each and each branch in a set has a same delay interval.

7. The apparatus as defined in claim 6 wherein a delay interval of a Yth set of branches is (Y−1), where Y is the number of sets and Y=1, 2 . . . Y.

8. The apparatus as defined in claim 1 wherein said splitter and said combiner are each a multimode interference coupler.

9. The apparatus as defined in claim 1 further including a precoder to apply control voltages to said plurality of optical phase modulators in response to receiving said data signal.

10. The apparatus as defined in claim 9 wherein said data signal is a digital signal.

11. A method for use in generating a modulated optical signal comprising:

receiving a sub-carrier modulated optical signal including an optical carrier and at least one sub-carrier; and analog vector modulating said sub-carrier modulated optical signal with a data signal to generate an output optical signal in which said one sub-carrier has been phase modulated and/or amplitude modulated responsive to said data signal, said analog vector modulating including optically power splitting said sub-carrier modulated optical signal into a plurality of optical branch signals, supplying each optical branch signal to a corresponding one of a plurality of optical branches, optically phase modulating each of said optical branch signals to phase shift it.

12. The method as defined in claim 11 further including the step of generating said sub-carrier modulated optical signal by generating an optical carrier signal and optically amplitude modulating said optical carrier with a prescribed signal to generate said sub-carrier modulated optical signal.

13. The method as defined in claim 11 further including the step of generating said sub-carrier modulated optical signal by generating a first optical carrier signal, generating a second optical carrier signal, and mixing said first optical carrier signal and said second optical carrier signal to yield said sub-carrier modulated optical signal, a frequency of said first optical carrier signal being offset relative to a frequency of said second optical signal.

14. The method as defined in claim 11 wherein said step of analog vector modulating further includes delaying each of said phase modulated optical branch signals by a prescribed delay interval and an optically combining said plurality of delayed optical phase shifted signals to generate said output optical carrier signal.

15. The method as defined in claim 14 wherein a delay interval of a Mth branch is (M−1) where M is the number of branches and M=1, 2 . . . M.

16. The method as defined in claim 14 wherein said branches are grouped in a plurality of sets including at least two branches each and each branch in a set has a same delay interval.

17. The method as defined in claim 16 wherein a delay interval of a Yth set of branches is (Y−1), where Y is the number of sets and Y=1, 2 . . . Y.

18. The method as defined in claim 17 wherein said data signal is a digital signal.

19. The method as defined in claim 14 wherein said splitting and said combining are each realized by employing a multimode interference coupler.

20. The method as defined in claim 11 further including a step of precoding a supplied data signal to generate control voltages that cause said plurality of optically phase modulators to generate said phase shifted optical branch signals.

* * * * *